No. 792,954. PATENTED JUNE 20, 1905.
J. G. ZINK.
SKIRT TRIMMER.
APPLICATION FILED MAY 6, 1904.
2 SHEETS—SHEET 1.
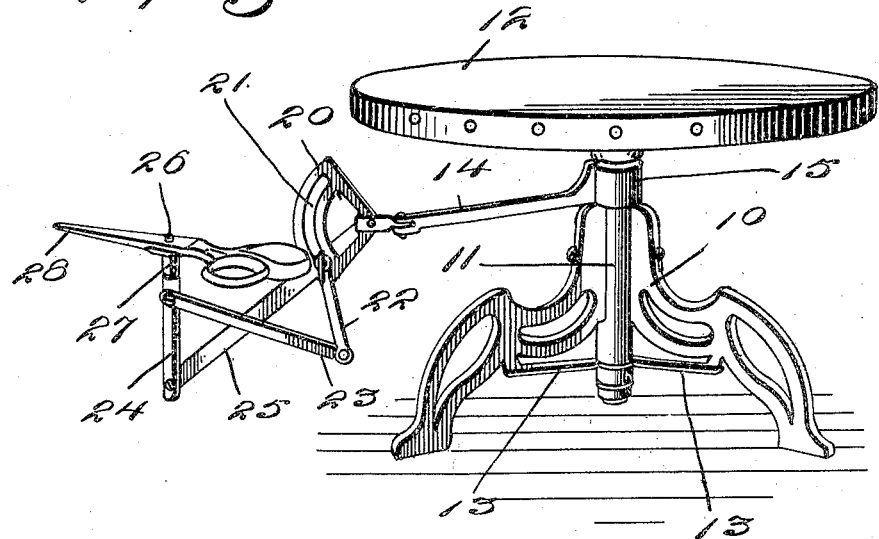
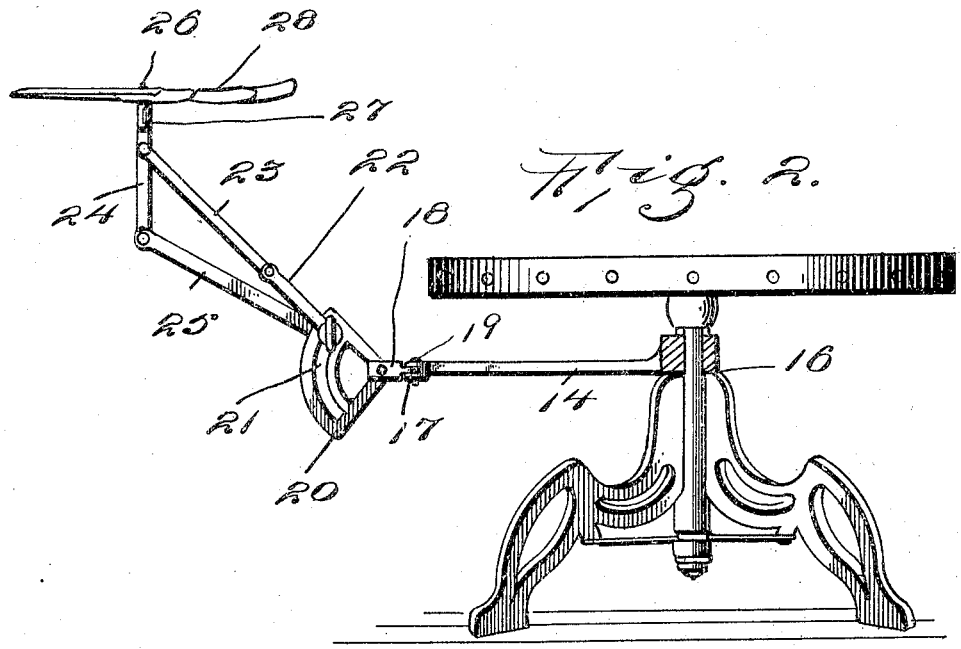
Witnesses
Inventor
J. G. Zink No. 792,954. PATENTED JUNE 20, 1905.
J. G. ZINK.
SKIRT TRIMMER.
APPLICATION FILED MAY 6, 1904.

2 SHEETS—SHEET 2.

Witnesses
Inventor
J. G. Zink
By
Chandler & Chandler
Attorneys

No. 792,954. Patented June 20, 1905.

UNITED STATES PATENT OFFICE.

JOHN G. ZINK, OF COLLINWOOD, OHIO.

SKIRT-TRIMMER.

SPECIFICATION forming part of Letters Patent No. 792,954, dated June 20, 1905.

Application filed May 6, 1904. Serial No. 206,775.

*To all whom it may concern:*

Be it known that I, JOHN G. ZINK, a citizen of the United States, residing at Collinwood, in the county of Cuyahoga, State of Ohio, have invented certain new and useful Improvements in Skirt-Trimmers; and I do hereby declare the following to be a full, clear, and exact description of the invention, such as will enable others skilled in the art to which it appertains to make and use the same.

This invention relates to an apparatus for trimming the bottoms of skirts, the object of the invention being to provide a construction with which a skirt may be trimmed evenly at any desired distance from the floor, a further object of the invention being to provide a structure which may be easily and quickly adjusted to cut at the various heights and in which the parts will be securely held in their different adjusted positions.

Figure 3:
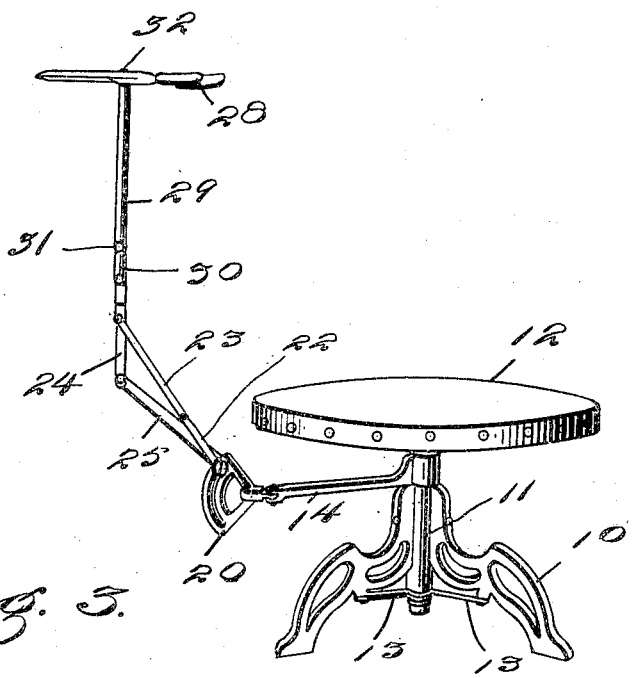
Figure 4:
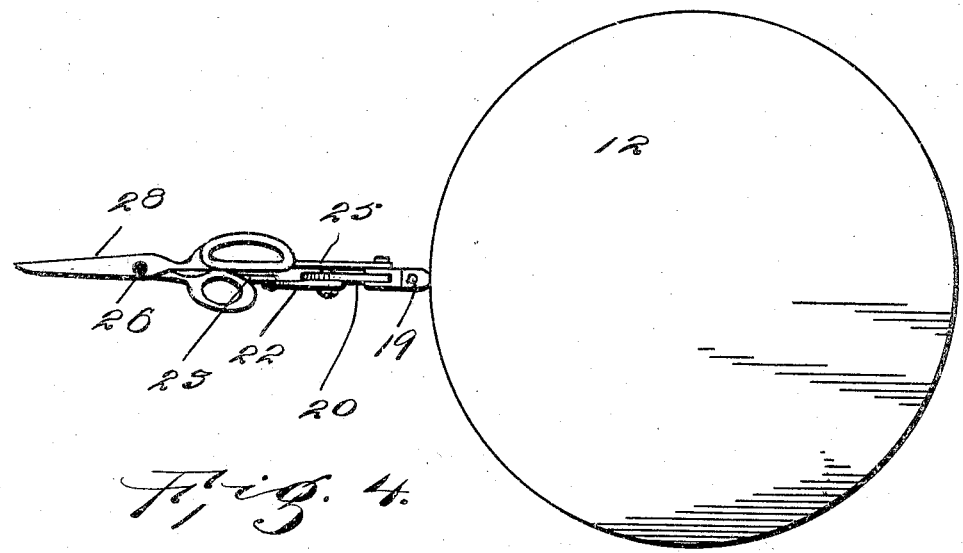

In the drawings forming a portion of this specification, and in which like numerals of reference indicate similar parts in the several views, Figure 1 is a perspective view showing the apparatus adjusted to cut at the lowest elevation. Fig. 2 is an elevation showing the apparatus adjusted to cut on a line above the platform, the collar at the inner end of the supporting-arm being in section. Fig. 3 is an elevation of the scissors-carrying portion of the apparatus with the extension in place. Fig. 4 is a top plan view of the scissors-carrying mechanism.

Referring now to the drawings, the present apparatus comprises a stool, including the tripod 10, the legs of which are bolted to the stem 11 of a platform 12 of disk shape, the lower end of the stem having suitable braces 13 to give the required rigidity.

In the use of the apparatus a person wearing the skirt to be trimmed stands upon the platform 12, so that the skirt, if a long one, will hang around the platform, and the scissors, mounted upon a carrier, are moved around the platform and operated to cut the skirt.

The carrier for the scissors consists of an arm 14, having a collar 15 at its inner end, which engages the stem 11 directly below the platform, this portion of the stem being reduced in diameter to form a shoulder 16, upon which the collar rests and rotates. The arm 14 projects beyond the periphery of the platform 12, and its outer end is bifurcated by slotting horizontally, and in this slot 17 is disposed the reduced end of a link 18, which is connected with the arm by the vertical pivot 19, so that the free end of the link may be swung laterally.

Fixed to the free end of the link 18 is a segment 20, which stands in a vertical plane and has an arc-shaped slot 21 therein. A link 22 is pivoted to the link 18 at the center of curvature of the slot 21, and an upright 23 is pivoted to the free end of the link 22. A link 24 is pivoted to the upright 23 just below its upper end, and at the opposite end of the link 24 is pivoted a link 25, which lies at the opposite side of the segment 20 from the link 22. A thumb-screw is passed loosely through the end of the link 25 and the slot 21 and is engaged in the link 22, so that the link 22 may be held at any point of its pivotal movement with respect to the segment, the thumb-screw serving to clamp the segment between the links 22 and 25.

At the upper end of the upright 23 is a reduced spindle 26, which is passed through the hollow pivot 27, which connects the blades of a pair of scissors 28.

The link 23 between the points of pivotal connection of the links 22 and 24 is the same length as the link 25 between the thumb-screw and the point of connection with the link 24, while the link 24 between its points of pivotal connection is the same length as the link 22 between the thumb-screw and its point of pivotal connection with the upright 23. With this construction when the thumb-screw is loosened the upright 23 may be raised and lowered, while its vertical position is maintained, and by adjusting the thumb-screw the parts may be clamped in any of their adjusted positions.

By reason of the pivotal mounting of the scissors upon the upright they may be swung readily in a horizontal plane during the cutting operation, and by reason of the link 18, which is pivoted for movement in a horizontal plane, the parts carried by the link may be swung horizontally to carry the scissors toward and away from the platform to conform to different specific conditions.

When it is desired to trim a short skirt, such as a child's skirt, the scissors 28 are removed from the spindle 26 and a rod 29, having a socket 30 at its lower end, is disposed in place of the scissors and is held to the spindle by a set-screw 31. The rod 29 has a reduced spindle 32 at its upper end for engagement with the hollow pivot of the scissors.

What is claimed is—

1. In a skirt-trimmer, the combination with a platform, of a carrier rotatable with respect to the platform said carrier extending outwardly from the edge thereof and scissors carried by the carrier and movable therewith around the platform.

2. In a skirt-trimmer, the combination with a platform, of a carrier rotatable with respect to the platform said carrier extending outwardly from the edge thereof and scissors carried by the carrier and movable therewith around the platform, said scissors being pivotally movable upon the carrier in a horizontal plane.

3. In a skirt-trimmer, the combination with a platform, of a carrier rotatable with respect thereto and extending outwardly from the edge thereof, and scissors carried by the carrier, said carrier being adjustable for movement of the scissors toward and away from the platform both vertically and horizontally.

4. In a skirt-trimmer, the combination with a platform having a stem provided with supporting-legs, of an arm rotatably engaged with the stem, a link pivoted to the free end of the arm and movable horizontally, a link pivoted to the free end of the first-named link, an upright carried by the second link, cutters pivotally mounted upon the upright, and means for holding the second link at various angles to the supporting-arm.

5. A skirt-trimmer comprising a platform having a supporting-stem, a carrier-arm rotatably engaged with the stem, a segment connected with the free end of the arm and movable laterally with respect thereto, a link pivoted to the segment, an upright pivoted to the outer end of the link, a pivoted brace connected between the segment and the upright, means for clamping the brace and the second link to the segment, and a cutter carried by the upright.

6. In a skirt-trimmer, the combination with a platform, of a carrier secured beneath the platform and extending outwardly therefrom, scissors pivotally mounted upon the carrier and arranged for movement to lie at times in a plane above the platform, and at times in a plane below the platform.

7. In a skirt-trimmer, the combination with a platform, of a carrier secured beneath the platform and rotatable with respect thereto, and scissors pivotally mounted on the carrier, said carrier being adjustable for movement toward and away from the platform both vertically and horizontally.

8. In a skirt-trimmer the combination with a platform, of an arm secured beneath the platform and extending horizontally therefrom, said arm being rotatable with respect to the platform, a segment connected with the free end of the arm, links pivoted to the segment, an upright connected to the free ends of the links, and a cutter pivotally mounted upon the upright for movement in a horizontal plane, said links being adjustable for vertical movement.

9. In a skirt-trimmer, the combination with a platform, of a carrier comprising an arm secured beneath the platform and extending therefrom, links pivoted to the free end of the arm, a rod connected to the free ends of the links, a cutter mounted upon the rod and pivoted for movement in a horizontal plane, said cutter being arranged for movement to vary its height with respect to the platform.

10. In a skirt-trimmer, the combination with a platform, of a carrier rotatable with respect to the platform, and scissors carried by the carrier, the blades of said scissors extending in a plane parallel with the platform.

11. In a skirt-trimmer, the combination with a platform, of a carrier arranged for movement with respect to the platform, and cutters carried by the carrier, said cutters being arranged to cut a piece of material extending at an angle to the platform.

In testimony whereof I affix my signature in presence of two witnesses.

JOHN G. ZINK.

Witnesses:
 F. H. HOUGHTON,
 C. A. BURROUGHS, Jr.